O. G. RIESKE.
CORN PLANTER.
APPLICATION FILED JULY 30, 1915.
1,248,717.
Patented Dec. 4, 1917.
2 SHEETS—SHEET 2.
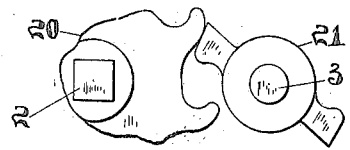
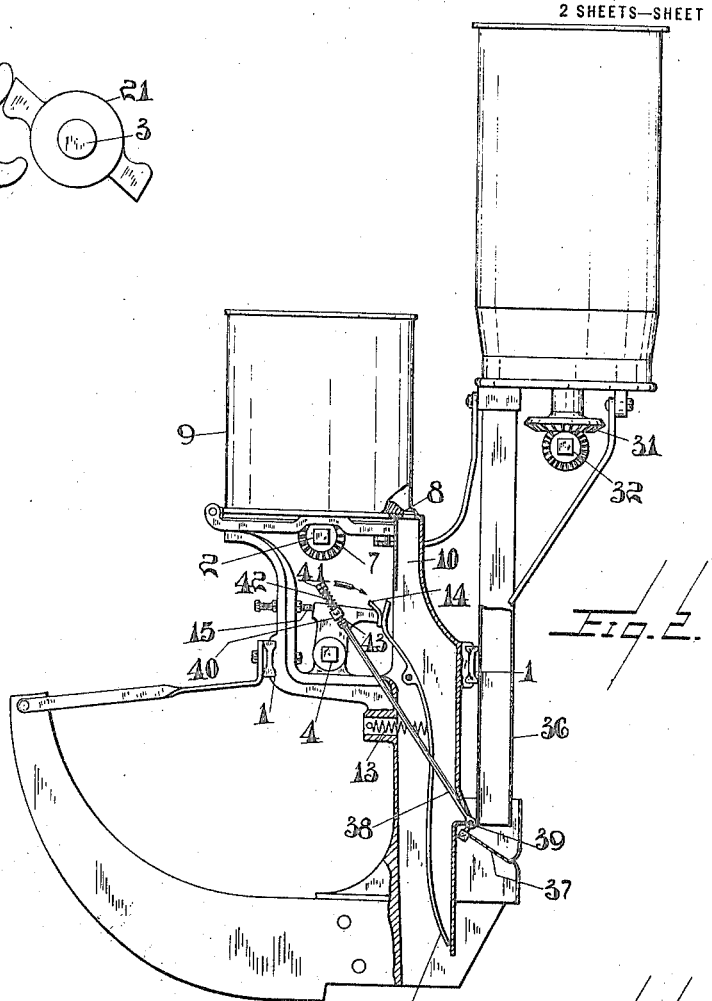
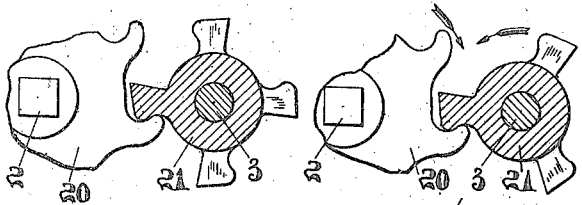
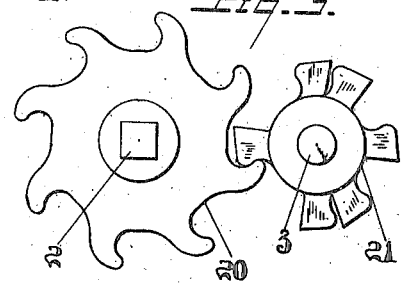
WITNESSES.
N. R. Tyndall
Geo. P. Mackie
INVENTOR.
O. G. Rieske.
BY J. Edward Maybee
ATTY.

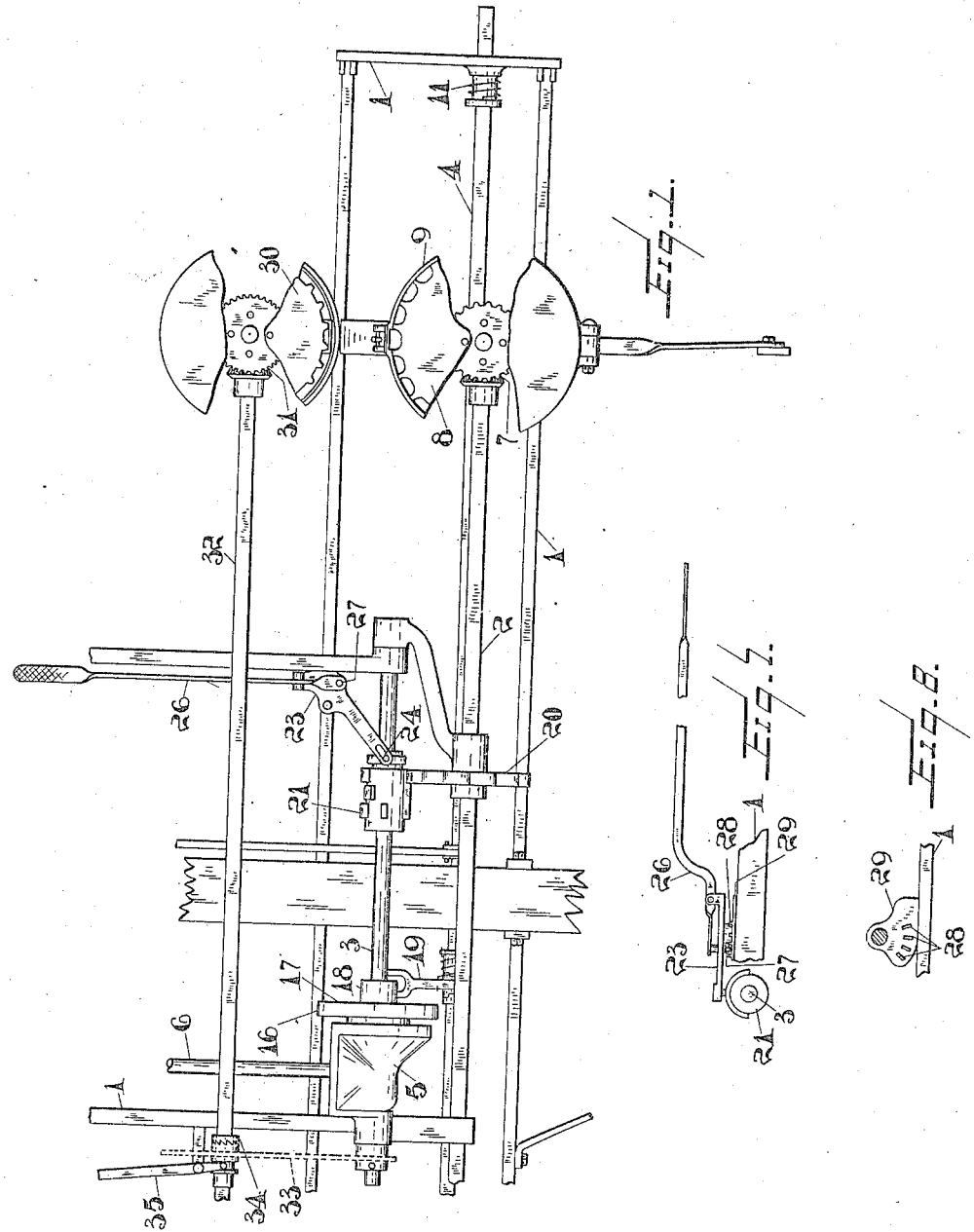

UNITED STATES PATENT OFFICE.

OTTO G. RIESKE, OF TORONTO, ONTARIO, CANADA, ASSIGNOR TO MASSEY-HARRIS COMPANY, LIMITED, OF TORONTO, ONTARIO, CANADA.

CORN-PLANTER.

1,248,717.

Specification of Letters Patent.   Patented Dec. 4, 1917.

Application filed July 30, 1915.   Serial No. 42,818.

*To all whom it may concern:*

Be it known that I, OTTO G. RIESKE, of the city of Toronto, in the county of York, Province of Ontario, Canada, a citizen of the United States of America, have invented certain new and useful Improvements in Corn-Planters, of which the following is a specification.

This invention relates to corn planters of the type using rotary seed feeding devices feeding to seed tubes in which are located valves which hold back the seed until tripped by suitable means. The tripping means usually employed comprises a check-rower wire and a check-rower shaft operated thereby, which shaft controls the operation of the seed feeding devices as well as the valves, and my object is to devise a corn planter which will be simple in construction and effective in operation, in which single-acting valves may be employed in the seed tubes, and which is easily adjusted to feed any desired number of grains of corn to a hill. A further object is to devise simple means for controlling the feeding of fertilizer to the hills.

I attain my objects by means of the constructions hereinafter specifically described and illustrated in the accompanying drawings in which—

Figure 1 is a plan view partly broken away of part of the corn planter constructed in accordance with my invention;

Fig. 2 a side elevation of the parts shown in Fig. 1 looking from the right hand side;

Fig. 3 a side elevation of the gearing between the driving shaft and the seeder shaft;

Figs. 4, 5 and 6 sectional views of the same partly broken away;

Fig. 7 a side elevation of the gear shifting lever partly broken away; and

Fig. 8 a plan view of the retaining quadrant therefor.

In the drawings like numerals of reference indicate corresponding parts in the different figures.

Referring more particularly to Figs. 1 and 2, 1 is part of the frame work of the planter which is suitably constructed and arranged to support the different parts. 2 is the seeder shaft, 3 the driving shaft therefor, and 4 the check-rower shaft all suitably journaled on the frame work.

This machine being of the type using a check-rower wire, the check-rower shaft will be provided with means whereby it may be rocked by a check-rower wire, and as such devices are common in the art, they are not herein described nor illustrated.

The driving shaft 3 for the seeder shaft is driven, through the medium of a clutch hereinafter described, by means of bevel gearing 5 from the longitudinal shaft 6, which will be driven from the ground wheels of the apparatus in any suitable manner.

The seeder shaft, by means of the bevel gearing 7, actuates the rotary seed plates 8 of the seeding devices 9, of which only one is illustrated in the drawing. The seed plates are of ordinary construction and each feeds the seed to a seed tube 10.

In corn planters of this type it is necessary to provide means for intermittently actuating the seeding devices to feed two or more grains to the seed tubes and to hold said grains in the seed tube until the desired number have been collected and the proper position reached for their deposit. I provide the following mechanism for this purpose.

The check-rower shaft is yieldingly maintained in its normal position by means of the coil spring 11, one end of which is connected with the frame and the other with the shaft. This check-rower shaft controls means for putting the driving shaft 3 in gear with the seeder shaft 2, and also controls the deposit of the seed from the seed tubes, each of which is provided with the single-acting pivoted valve 12.

By single-acting, it will be understood that I mean a valve which holds the seed at one end only and not at each end alternately as in some forms of planters.

Each valve is normally held in its closed position by means of a coil spring 13 engaging the valve and lying partly in the recess in the seed tube. The upper end of each valve is adapted for engagement by a tappet 14, which, when rocked in the direction indicated by arrow in Fig. 2, will open the valve. A set screw 15 forms an abutment which limits the backward movement of the tappet and also of the check-rower shaft 4.

The driving shaft 3 carries a clutch comprising a member 17 loose on the shaft and a member 18 fast on the shaft. This clutch will be of an ordinary type normally tending to engage and adapted to be held out of engagement by means of a trip arm, such a clutch, for example, as is shown in United States Patent 687352.

The trip arm 19 for the clutch is located on the check-rower shaft 4, as is commonly the case. The check-rower shaft thus controls the clutch as well as the valve.

The seeder shaft 2 carries a spur gear wheel 20. On the driving shaft 3 a spur pinion 21 is slidable by means of a feather key. This pinion is provided with a plurality of sets of teeth 22, the sets having pitch circles of the same diameter. A different number of teeth is however provided in each set, preferably two teeth in the first set, three in the second and four in the third, as shown particularly in Figs. 1, 3, 4, 5 and 6. The first teeth in each set are in alinement and in form substantially continuous, (see particularly Figs. 1 and 3). This continuous tooth is always in mesh with the spur wheel 20 when the clutch 16 is thrown out of gear, so that the pinion 21 is readily shifted without interfering with its proper meshing with the spur wheel.

As will be noted on reference particularly to Fig. 6, the teeth of the pinion are so proportioned relative to the spaces between the teeth of the gear wheel that considerable lost motion is allowed for. From this it follows that the spur gear does not commence to move until the pinion has made some considerable movement. The purpose of this is to provide time for the check-rower shaft to operate the gate valve to deposit the seed which has previously been dropped into the seed tube and to move back to allow the valve to regain its normal closed position before the seeding devices have moved sufficiently to feed any portion of the fresh supply of seed to the seed tubes.

Owing to the provision of this lost motion, it is necessary to give the teeth of the spur gear and the pinion such a shape that it is not possible for the teeth of one to jam on the ends of the teeth of the other. I accomplish this result by giving the teeth the shape shown in Figs. 3 to 6 of the drawings. It will be noted that each tooth of the spur gear 20 is provided with a concave rearward side which merges into the rounded end of the tooth, which projects somewhat rearwardly having reference to the direction of rotation of the gear. The front of each tooth is convexly curved and inclined rearwardly.

The teeth of the pinion have their forward or driving faces of ogee form as shown to coöperate with the backs of the spur gear teeth, while the rearward sides may have any suitable shape or may be straight as shown. From this shaping of the teeth it results that despite the wide spacing of the teeth of the spur gear that each tooth of the pinion will move it sufficiently to enable the next tooth of the pinion to engage behind the next tooth of the spur wheel. If there be any accidental shifting of either the pinion or gear wheel which would bring the rearward sides of the pinion teeth in contact with the backs or ends of the spur wheel teeth, the engagement would be substantially as indicated in Fig. 6 and the spur gear would be rotated backward a little until the pinion tooth had sufficient clearance to enable it to move into the space ahead and engage the next forward tooth as shown in Figs. 3 to 5 of the drawings. The specific form of gearing is claimed in a divisional application, Ser. No. 86,022, filed March 22, 1916.

The pinion is shifted by means of a suitable shifter lever. Preferably I employ a two part lever as illustrated particularly in Figs. 1, 7 and 8 of the drawings. This lever comprises a part 23 pivoted on a suitable casting secured to the frame of the machine. This lever, by means of a pin and slot connection 24, engages a shifter ring of ordinary type suitably connected with the pinion 21. The other part 26 of the lever is pivoted on the part 23 and carries a pin 27 operating through a hole in the part 23 and having its free end adapted to engage the teeth 28 of the stationary quadrant 29. By depressing the lever 26 the pin 27 may be disengaged. A sidewise movement of the lever may then be made to shift the pinion as desired.

In connection with the corn planter I provide means for dropping fertilizer either at the same time as or shortly after the deposit of the seed. This mechanism is arranged as follows: The fertilizer distributers 30 of the ordinary rotary type are operated by means of bevel gearing 31 from the fertilizer distributer shaft 32 suitably journaled on the frame. This shaft is driven by means of sprocket gearing 33 from the driving shaft 3 through the medium of a clutch 34 provided with a shifter 35 of ordinary type so that fertilizer may be distributed or not as desired. Each fertilizer distributer is provided with the discharge tube 36, each of which leads to a point just behind one of the seed tubes 10. The lower end of each discharge tube is provided with the pivoted valve 37. This valve is operated by means of the connecting rod 38, which is pivotally connected with the valve 37 preferably by means of the shaft crank arm 39 formed on the pivot to which the valve 37 is secured. The other end of this connecting rod passes through the lug 40 on the tappet 14.

Between the lug and the nut 41 screwed on the outer end of the connecting rod is located a coil spring 42. This yieldingly maintains the valve 37 closed. On the other side of the lug 40 an abutment is formed on the connecting rod. This is preferably formed by a nut 43 screwed on the rod. When the tappet rocks in the direction indicated by arrow, no movement of the valve 37 takes place until the lug 40 strikes the nut 43. Therefore, by adjusting the nut, the valve 37 may be adjusted to open any desired time later than the opening of the valve 12, or if the nut 43 be adjusted to contact with the lug 40 when the tappet 14 is in its normal position, the two valves will open simultaneously.

What I claim as my invention is:—

1. In a corn planter the combination of ground wheels; rotary seeding devices; a seeder shaft for actuating said devices; a clutch shaft; a driving connection between the ground wheels and said shaft including a clutch on said shaft; seed tubes adapted to receive seed fed by the seeding devices; a normally closed single-acting valve in each of said tubes; a check rower shaft adapted to control the clutch; means actuated by the check-rower shaft for opening said valves when the aforesaid clutch is put in gear; and gearing between the clutch shaft and the seeder shaft possessing sufficient lost motion to allow the valves to reclose before the seeder shaft operates.

2. In a corn planter the combination of ground wheels; rotary seeding devices; gearing between said devices and the ground wheels including a clutch; seed tubes to which said devices feed; a single-acting valve in each seed tube yieldingly held closed; a check-rower shaft adapted normally to hold the clutch out of gear and adapted when moved to release the clutch and open the valve; and yielding means tending to hold the check-rower shaft in normal position, lost motion being provided in the gearing of the seeding devices between the clutch and seeding mechanisms to permit of the re-closing of the valves before the seeding devices operate.

3. In a corn planter the combination of a seed tube; a valve therein; a rock shaft adapted to actuate said valve; a fertilizer tube adjacent the seed tube; a valve therein; and actuating members, with suitable connections, adapted to actuate both valves including a connecting rod pivotally connected to one valve, a lug on the actuating member through which said connecting rod passes, an abutment being formed on the connecting rod for engagement by the lug, and a coil spring engaging the lug and the connecting rod tending to close the fertilizer valve.

4. In a corn planter the combination of a seed tube; a valve therein; a rock shaft adapted to actuate said valve; a fertilizer tube adjacent the seed tube; a valve therein; and actuating members, with suitable connections, adapted to actuate both valves including a connecting rod pivotally connected to one valve, a lug on the actuating member through which said connecting rod passes, an abutment being formed on the connecting rod for engagement by the lug, and a coil spring engaging the lug and the connecting rod tending to close the fertilizer valve, the abutment being formed by a nut screwed on the connecting rod.

Dated at Toronto, Can., this 26th day of July, 1915, in the presence of the two undersigned witnesses.

OTTO G. RIESKE.

Witnesses:
GEO. P. MACKIE,
N. R. TYNDALL.